May 27, 1924.

Re. 15,849

R. SCHEANBLUM ET AL

HAIR FOUNDATION

Original Filed March 30. 1920

INVENTOR
Robert Scheanblum
Grace Scheanblum
BY Jas. H. Griffin
ATTORNEY

Reissued May 27, 1924. Re. 15,849

UNITED STATES PATENT OFFICE.

ROBERT SCHEANBLUM AND GRACE SCHEANBLUM, OF DANBURY, CONNECTICUT.

HAIR FOUNDATION.

Original No. 1,347,915, dated July 27, 1920, Serial No. 369,911, filed March 30, 1920. Application for reissue filed March 19, 1921. Serial No. 455,173.

*To all whom it may concern:*

Be it known that we, ROBERT SCHEANBLUM and GRACE SCHEANBLUM, citizens of the United States, residing at Danbury, in the county of Fairfield and State of Connecticut, have invented certain new and useful Improvements in Hair Foundations, of which the following is a specification.

The invention relates to improvements in hair foundations.

It has been proposed to provide various forms of supports or the like for producing a puff or roll effect in the hair, and to so distribute a limited amount of hair as to give the appearance of an abundance of hair, but especially in the use of supports for producing rolls or dips in the side of the hair considerable difficulty has been experienced in providing a design that will give the hair a pleasing appearance, and at the same time so grip the hair as to eliminate the possibility of the foundation slipping when the hair is rolled thereon.

It is therefore an object of the present invention to provide a foundation which is of a configuration to form a pleasing roll, puff or dip, and so constructed as to tightly grip the hair when placed through the foundation to prevent a displacement thereof when the hair is rolled upon the foundation.

With the foregoing conception in mind, the invention preferably consists of a foundation having merging end portions and an intermediate portion gradually increased in diameter. Secured to the merging end portions there is provided a hair support of a bowed formation extending above the end parts and around which the hair is rolled. Preparatory to rolling the hair, the same is passed through the foundation and around the single supporting portion, being tightly gripped by the merging sides, so that when the hair is rolled there is little or no possibility of the support slipping from the hair which has heretofore been a decided disadvantage in the use of devices of this kind.

Figure 1:
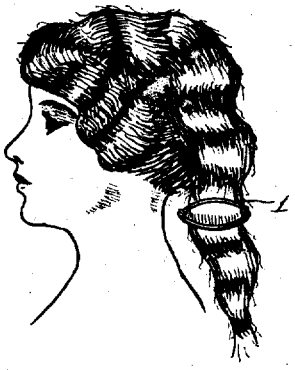
Figure 2:
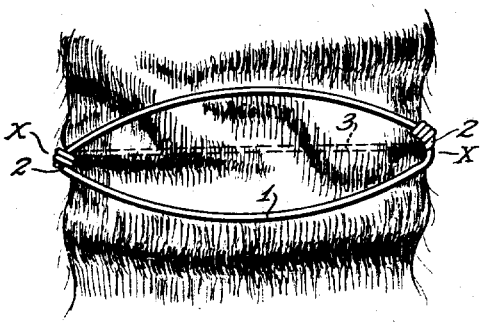
Figure 4:
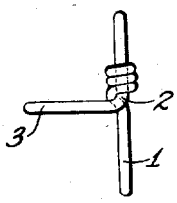
Figure 3:
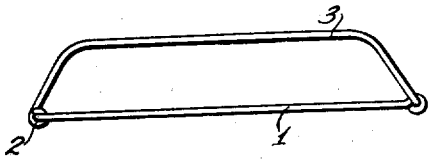

In the accompanying drawing we have disclosed a single embodiment of the invention, wherein, Figure 1 represents the support being applied to the hair;

Fig. 2, discloses the hair passing through the support and being gripped by parts thereof, and Figs. 3 and 4 are detail views.

Referring now more particularly to the drawings, wherein like reference characters indicate corresponding parts, the foundation consists of a pair of side portions 1 composed of a light substance such as wrapped wire or the like, the side portions being of an elliptical formation and merging at the points 2. These sides are gradually curved so as to present no abrupt or sharp points, and when rolled in the hair especially where the devices are to be used for producing a dipped or puff effect, give the ultimate roll a more attractive appearance.

Secured to the side portions 1 which constitute the base of the support is a central supporting bar 3, which extends entirely across the base and is secured thereto at the point where the sides merge. This central support is elevated so as to extend a material distance above the sides 1, as clearly disclosed in Fig. 4.

When the device is to be used, the hair is first passed under one of the curved sides 1, then over the central support 3, and down under the other curved side 1 as clearly shown in Fig. 2. The hair thus passed through the support is firmly gripped at the points X, so that there is little or no possibility of the support working loose on the hair when the hair has been rolled thereon. After the hair has been passed through the support in the manner above described, it is understood that the entire support is then rolled so as to wind the hair thereon, the same covering the foundation, the base of the foundation being of an elliptical shape so that the produced roll, dip or puff conforms somewhat to the shape of the support, which permits the hair to be dressed in a highly attractive manner.

Having thus described the invention, what we claim is:

1. A hair foundation comprising a base of elliptical formation, and a central support secured to the base at the pointed ends thereof and extending entirely across said base, said central support being of a curved formation and projecting a material distance above the base.

2. A hair foundation comprising a base of elliptical formation, and a central support secured to the base at the pointed ends thereof and extending entirely across said base, said central support being positioned relative to the base to provide a space on each side thereof for the passage of the hair to be gripped by the elliptical sides of the base and the central support and of a bowed formation to project a material distance above the base.

3. A hair foundation comprising a base of relatively light wire, of elliptical formation, a central support secured to the base at a point where the sides merge, said support being of a relatively light wire material and coextensive with the base, the support being of a bowed formation and projecting a material distance beyond the base, and positioned relative to the base to provide a space on each side thereof for the passage of hair to be gripped by the elliptical sides of the base near their merging points and by the central support.

4. A hair foundation comprising a closed flat base of suitable conformation all parts of which lie in substantially the same plane, and a central support extending across said base with its ends secured to the base and being without other attachment to the base, said central support being for the greater portion of its length parallel to the plane of the base and positioned a material distance above the base.

5. A hair foundation comprising a permanently closed, elongated base, and an upstanding longitudinally bowed central support extending entirely across and bisecting the base with its opposite ends permanently associated with the base and otherwise free from attachment to the base to provide a single enlarged space on each side thereof through which the hair may be passed whereby the hair is embraced within the spaces within the base and on either side of the central support.

In testimony whereof, we have signed our names to this specification.

ROBERT SCHEANBLUM.
GRACE SCHEANBLUM.